United States Patent [19]
Cocca et al.

[11] Patent Number: 5,347,437
[45] Date of Patent: Sep. 13, 1994

[54] ELECTRONIC JEWELRY WITH INSCRIBED FIBER OPTIC TAIL

[76] Inventors: Lorraine A. Cocca; Gary L. Turbeville, both of 4999 NW. Fourth Ave., Boca Raton, Fla. 33431; Cesare W. Brown, 6807 Calle Del Paz S., Boca Raton, Fla. 33433

[21] Appl. No.: 75,753
[22] Filed: Jun. 11, 1993
[51] Int. Cl.$^5$ .............................................. F21L 15/08
[52] U.S. Cl. ...................... 362/104; 362/32; 362/800; 362/806; 40/547; 63/1.1; 63/2; 63/20
[58] Field of Search ................ 362/32, 103, 104, 800, 362/806, 26, 320; 385/114, 147, 901; 63/1.1, 2, 12, 13, 14.1, 20; 40/547

[56] References Cited

U.S. PATENT DOCUMENTS

| | | | |
|---|---|---|---|
| 3,535,018 | 10/1970 | Vasilatos | 362/32 |
| 4,009,381 | 2/1977 | Schreiber et al. | 362/32 |
| 4,186,425 | 1/1980 | Nadimi | 362/32 |
| 4,237,525 | 12/1980 | Deter | 362/104 |
| 4,279,089 | 7/1981 | Murakami | 362/32 |
| 4,638,409 | 1/1987 | Berman | 362/104 |
| 4,652,981 | 3/1987 | Glynn | 362/103 |
| 4,692,846 | 9/1987 | Johnson | 362/104 |
| 4,719,544 | 1/1988 | Smith | 362/104 |
| 4,727,603 | 3/1988 | Howard | 362/103 |
| 4,791,536 | 12/1988 | James | 362/104 |
| 4,912,608 | 3/1990 | Lee | 362/806 |
| 4,961,617 | 10/1990 | Shahidi et al. | 385/114 |
| 4,977,487 | 12/1990 | Okano | 362/32 |
| 5,018,053 | 5/1991 | Belknap et al. | 362/104 |
| 5,165,187 | 11/1992 | Shahidi-Hamedani et al. | 385/901 |
| 5,201,578 | 4/1993 | Westmoland | 362/806 |

*Primary Examiner*—Ira S. Lazarus
*Assistant Examiner*—Alan Cariaso
*Attorney, Agent, or Firm*—Quarles & Brady

[57] ABSTRACT

A fiber optic tail for a jewelry clasp is coupled to the light-emitting diode by a piece of stretchable and shrinkable tubing. A symbol or legend is inscribed on the tail ribbon such that light is emitted around an edge of the symbol to illuminate the symbol. In a second embodiment, a backlit symbol in a fiber optic ribbon is seen through a window in a cover, which may be decorated.

18 Claims, 3 Drawing Sheets

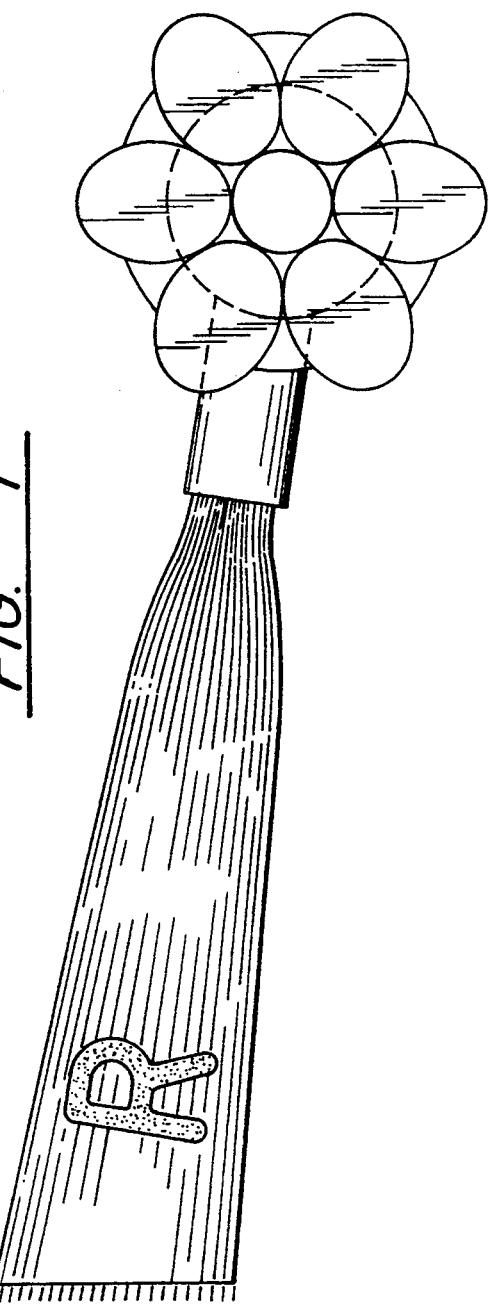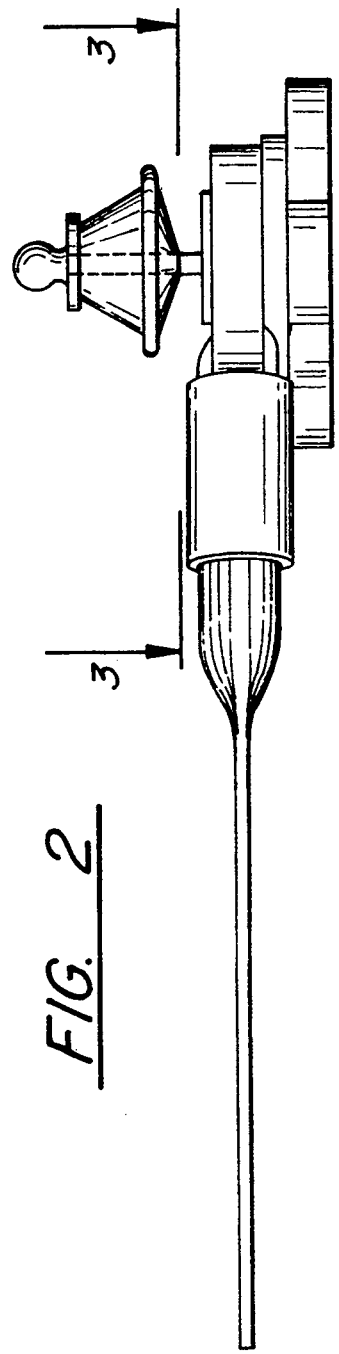
FIG. 1
FIG. 2

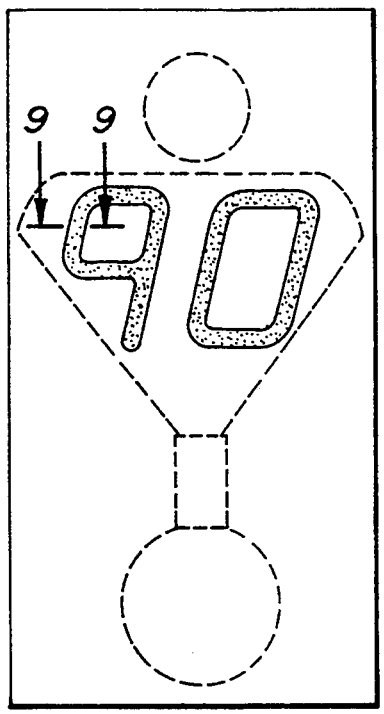
FIG. 6
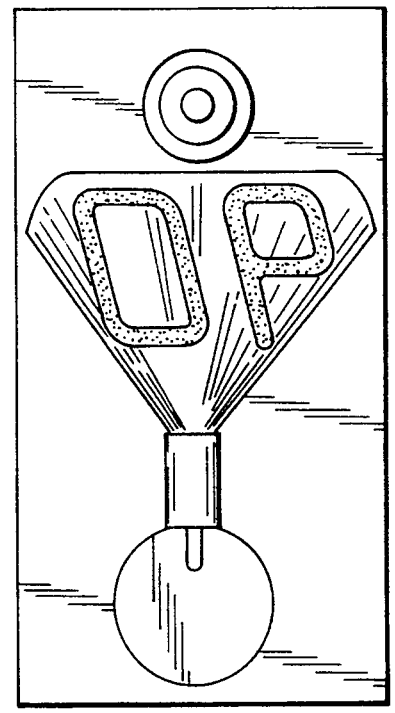
FIG. 7
FIG. 8
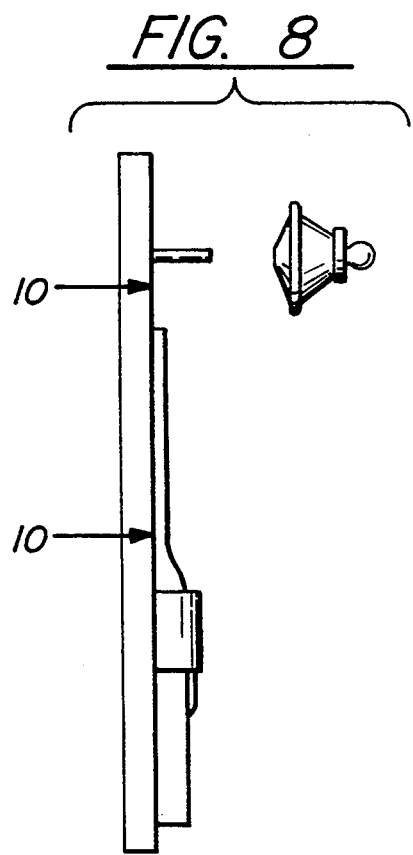
FIG. 9
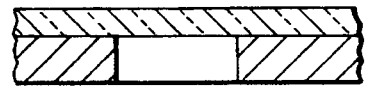
FIG. 10
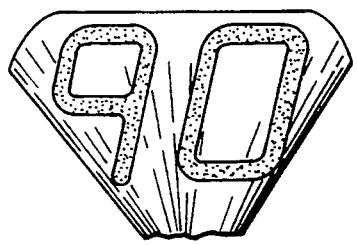

ELECTRONIC JEWELRY WITH INSCRIBED FIBER OPTIC TAIL

BACKGROUND OF THE INVENTION

1. Field of the Invention

The invention relates to electronic jewelry of the type employing optical fibers.

2. Description of Prior Art

Smith, U.S. Pat. No. 4,719,544, discloses ornamental electronic jewelry preferably in the form of an earring in which fiber optic strands extend from a housing. The housing contains a self-contained battery and light-emitting diode (LED). The fiber-optic strands are directly attached to the LED through an opening in the LED housing. A battery is electrically connected to the LED so that the LED transfers light to the bundle of fiber optic strands.

One of the technical problems in using fiber optic strands is attachment to the LED. Another problem is providing some type of switch for ON-OFF operation. Another problem is presenting an aesthetic appearance in an item incorporating such items as batteries and electrical leads.

There is a potential market for new forms of jewelry employing the creative use of fiber optics in forms not previously known.

SUMMARY OF THE INVENTION

The invention relates to an illuminated, opaque or translucent, fiber optic tail for a jewelry clasp. A discontinuity is provided in a fiber optic tail ribbon in the shape of one or more symbols. The discontinuity allows emission of light around the edges of the symbol to highlight the symbol. Preferably the symbol is an alphanumeric symbol, but graphical symbols can also be used.

In a second embodiment, a window is provided in a cover piece that hides the electronics. The window is backlit by a discontinuity of corresponding shape in a fiber optic ribbon mounted behind the cover piece.

The first embodiment of the invention more particularly includes a cover for hiding a power source, a light-emitting diode having leads electrically connectable to the power source, and a piece of ribbon containing a plurality of light-transmissive fibers. The piece of ribbon has a discontinuity in the light-transmissive fibers in the shape of at least one alphanumeric symbol, such that when light is transmitted through the fibers, light will be emitted around the edges of the alphanumeric symbol, but not emitted within other internal parts of the ribbon.

One object of the present invention is to provide for an illuminated tail with a number or symbol that enhances a picture or design on a main body of the clasp.

Another object is to provide for simple and inexpensive backlit symbols into electronic jewelry.

Another object of the invention is to provide an improved mechanism for attaching fiber optic strands to a light-emitting diode.

Another object of the invention is to provide for an ON-OFF mechanism that does not require a bulky switch.

Other objects and advantages, besides those discussed above, will be apparent from the description of the preferred embodiment, which follows. In the description, reference is made to the accompanying drawings, which form a part hereof, and which illustrate examples of the invention. Such examples, however, are not exhaustive of the various embodiments of the invention, and, therefore, reference is made to the claims which follow the description for determining the scope of the invention.

BRIEF DESCRIPTION OF THE DRAWINGS

FIG. 1 is a front view in elevation of a fiber optic jewelry assembly according to the present invention;

FIG. 2 is a top plan view of the assembly of FIG. 1;

FIG. 6 is a front view in elevation of a third assembly of fiber optic jewelry according to the present invention;

FIG. 7 is a rear view in elevation of a portion of the assembly of FIG. 6;

FIG. 8 is a side view in elevation, partially exploded, of the assembly of FIG. 7;

FIG. 9 is a sectional view taken in the plane indicated by line 9—9 in FIG. 8; and FIG. 10 is a detail sectional view taken in the plane indicated by line 10—10 in FIG. 8.

DETAILED DESCRIPTION OF THE PREFERRED EMBODIMENTS

Figure 4:
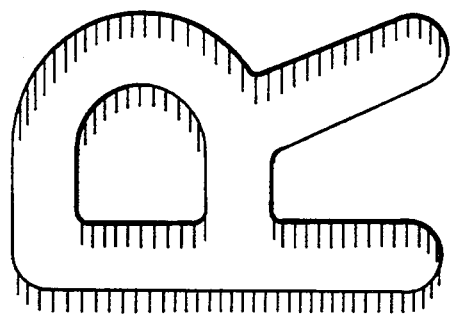
FIG. 4 is a fragmentary detail view of a portion of FIG. 1.
Figure 3:
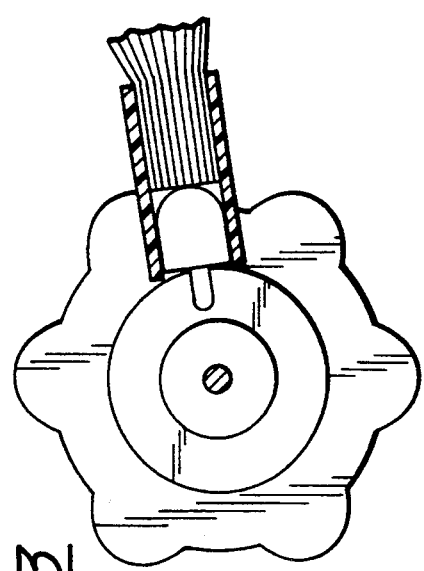
FIG. 3 is a detail rear view of the assembly of FIG. 1 taken in the plane indicated by line 3—3 in FIG. 2.
Figure 5:
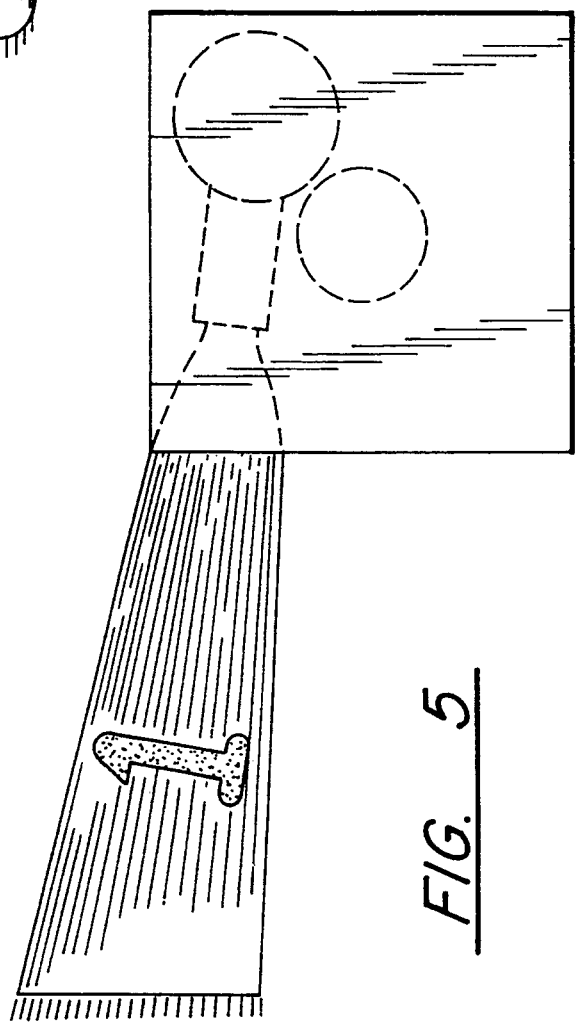
FIG. 5 is a front view in elevation of a second assembly of fiber optic jewelry according to the present invention.

FIGS. 1-4 show a first assembly of the invention in the form of a fiber optic jewelry clasp 10. Its parts include a small, disc-shaped +3-volt battery 11 such as the CR1220 available from Panasonic, which is mounted behind a decorative cover 12 with central hub 13 and multiple lobes 14 radiating from the central hub 13. The battery 11 is fixed to the back of cover 12, and post 14, seen in FIG. 2, is integrally formed with base 15, which in turn is adhesively attached to battery 11. Clip 16 of a known type slides over post 14 to capture a piece of clothing (not shown) and hold the clasp 10 in place on a wearer. FIG. 5 shows another example of a clasp 25 in which a cover 26 totally covers and hides the battery 11 and other parts of the assembly.

Extending from battery 11 is a fiber optic tail assembly. This includes an LED 19, the bulb portion being seen best in FIG. 3 as it is received in one end of stretchable and shrinkable tubing 20. One end of fiber optic ribbon 21 is inserted in the other end of the tubing 20. Leads 17, 18 extend from the bulb potion to contact the battery 11 as seen in FIG. 2. The fiber optic ribbon 21 contains a plurality of fiber optic strands 22 in a web of translucent, synthetic resinous or plastic material.

Light from the LED 19 is beamed through the fiber optic ribbon 21, and will normally only be emitted at the ends of strands 22 as indicated at reference 24 in FIG. 1. In the invention, however, a discontinuity is created between the anchored end of the ribbon 21 and the free end, with this discontinuity being in the shape of one or more alphanumeric symbols or letters. In FIGS. 1 and 4, the letter is "R". In FIG. 5, the symbol is the number "1". Graphical symbols and shapes can also be used. The discontinuity can be formed by abrading the ribbon 21 or heat stamping the desired shape, as represented by the stippled regions in FIGS. 1 and 5.

As seen in FIG. 4, light is now emitted along edges of the letter nearer to the battery 11, but as the discontinuity is short, in terms of line width of the letters or numbers, it appears as if light is filling the letters, or that the letters are glowing. Light is also emitted at the end of the ribbon 21 as indicated by reference 24. Light is emitted in the color selected for the LED 19, red, for example. It should also be apparent that a small capacitor or flasher can be included in the circuit, if desired. Besides the symbols formed in the ribbon 21 and the end of the ribbon 21, light from the LED 19 will not be emitted from the ribbon 21, and the ribbon will retain it original appearance, which is non-colored translucence in this embodiment.

To switch the glowing parts of the ribbon "on" and "off" in FIG. 2, the leads 17 and 18 are selected to be flexible and yieldable, so that the fiber optic tail can be slid on and off the battery 11. Opposite sides of the battery 11 are of different polarity (+ or −) and the leads 17 and 18 connect to the anode and cathode of the LED. When the positive (+) contact on the battery 11 is connected to the anode of the LED 19, the LED 19 will conduct current and turn on. When the positive (+) contact on the battery 11 is connected to the cathode of the LED 19, the LED 19 is blocking current and will not be illuminated. By pulling the leads 17, 18 away from battery 11, reversing the facing position of the tail between front and back, and pushing the leads 17, 18 back into contact with the battery 11, the tail can be turned "on" and "off" without the need for bulky switches. It should also be apparent that the battery 11 can be made removable and reversible relative to the leads 17, 18 to accomplish the same result.

FIGS. 6–10 show a backlit electronic jewelry clasp 30 in which the number "90" is inscribed on fiber optic ribbon 33 in the manner described for the symbols in FIGS. 1–5. Cover 31 can carry a graphic or remain a solid color. Cover 31 has an aperture 32 cut into it in the shape of the number "90". The aperture 32 is aligned with the number "90" illuminated on a piece of fiber optic ribbon 33 of the type described for the first assembly 10 of FIGS. 1–4. It should be apparent that although an aperture 32 is disclosed, this is but one form of transparent or translucent window that can be employed over symbol "90" to provide a backlit clasp 30. Battery 34 is mounted on the back side of cover 31, so as to be hidden from view when the clasp 30 is worn.

Two leads 35 from an LED hidden in stretchable and shrinkable tube 37 slide over the positive and negative contacts on battery 34. As seen best in FIG. 8, post 38 projects laterally from vertically disposed cover 31, and clip 39 of a known type slides over post 38 to secure the clasp 30 on a person's clothing.

FIG. 9 illustrates a portion of the aperture 32 which allows the illuminated number "90" to be seen through the cover 31. FIG. 10 shows a portion of the ribbon 33 hidden in FIG. 5.

It should now be apparent that the invention provides new and improved fiber optic jewelry, with enhanced visual effects and convenient features of construction.

This has been a description of an of how the invention can be carried out. Those of ordinary skill in the art will recognize that various details may be modified in arriving at other detailed embodiments, and these embodiments will come within the scope of the invention.

Therefore, to apprise the public of the scope of the invention and the embodiments covered by the invention, the following claims are made.

I claim:

1. Electronic jewelry operable with a power source and having a fastener for attachment of the jewelry, the electronic jewelry comprising:
   a cover for at least partially covering the power source and the fastener;
   a light-emitting diode having leads electrically connectable to the power source to cause light to be emitted from the light-emitting diode;
   a piece of ribbon containing a plurality of light-transmissive fibers, said piece of ribbon having a discontinuity of the light-transmissive fibers in the shape of a symbol; and
   means for mounting one end of the ribbon to one end of the light-emitting diode and covering said light emitting diode, such that when light is transmitted from the light emitting diode, such light will be transmitted through the fibers and emitted around an edge of the symbol, but such light will not be emitted within other internal parts of the ribbon.

2. The electronic jewelry of claim 1, wherein the fiber optic ribbon is made of a translucent material.

3. The electronic jewelry assembly of claim 1, wherein the cover for at least partially covering the power source covers said ribbon at the location of said discontinuity in the shape of a symbol, and has a window overlying and corresponding to the shape of the symbol.

4. The electronic jewelry assembly of claim 1, wherein the symbol is a letter of the alphabet.

5. The electronic jewelry assembly of claim 1, wherein the symbol is a number.

6. The electronic jewelry assembly of claim 1, wherein the means for mounting one end of the ribbon includes a piece of stretchable tubing with one end receiving and covering the light-emitting diode and with an opposite end receiving the one end of the ribbon.

7. Electronic jewelry operable with a power source and having a fastener for attachment of the jewelry, the electronic jewelry comprising:
   a cover for completely covering the power source and the fastener;
   a light-emitting diode having leads electrically connectable to the power source to cause light to be emitted from the light-emitting diode;
   a piece of ribbon containing a plurality of light-transmissive fibers, said piece of ribbon having a discontinuity of the light-transmissive fibers in the shape of a symbol; and
   means for mounting one end of the ribbon to one end of the light-emitting diode, for covering said light-emitting diode and for ensuring that substantially all light emitted thereby will be transmitted through the fibers and emitted around an edge of the symbol, but such light will not be emitted within other internal parts of the ribbon.

8. The electronic jewelry assembly of claim 7 wherein the cover for completely covering the power source has a window overlying and corresponding to the shape of the symbol.

9. The electronic jewelry assembly of claim 7, wherein the symbol is a letter of the alphabet.

10. The electronic jewelry assembly of claim 7, wherein the symbol is a number.

11. The electronic jewelry assembly of claim 7, wherein the means for mounting one end of the ribbon includes a piece of stretchable tubing with one end receiving and covering the light-emitting diode and with an opposite end receiving the one end of the ribbon.

12. Electronic jewelry operable with a power source and having a fastener for attachment of the jewelry, the electronic jewelry comprising:
   a cover for completely covering the power source and the fastener;
   a light-emitting diode having leads electrically connectable to the power source to cause light to be emitted from the light-emitting diode;
   a piece of ribbon containing a plurality of light-transmissive fibers, said piece of ribbon having a discontinuity of the light-transmissive fibers in the shape of a symbol;
   means for mounting one end of the ribbon to one end of the light-emitting diode, for covering said light-emitting diode and for ensuring that substantially all light emitted thereby will be transmitted through the fibers and emitted around an edge of the symbol, but such light will not be emitted within other internal parts of the ribbon; and
   said cover further completely covering said piece of ribbon and having an aperture cut into it in a shape corresponding to said symbol on said ribbon and at a location to be coextensive with said symbol on said ribbon to allow light to be transmitted from said ribbon directly through said aperture.

13. The electronic jewelry assembly of claim 12, wherein the symbol is a letter of the alphabet.

14. The electronic jewelry assembly of claim 12, wherein the symbol is a number.

15. The electronic jewelry assembly of claim 12, wherein the means for mounting one end of the ribbon includes a piece of stretchable tubing with one end receiving and covering the light-emitting diode and with an opposite end receiving the one end of the ribbon.

16. The electronics jewelry assembly of claim 1, wherein the fastener is configured for attachment of the jewelry to clothing.

17. The electronics jewelry assembly of claim 7, wherein the fastener is configured for attachment of the jewelry to clothing.

18. The electronics jewelry assembly of claim 12, wherein the fastener is configured for attachment of the jewelry to clothing.

* * * * *